United States Patent [19]

Bhattacharyya, deceased et al.

[11] Patent Number: 5,116,514

[45] Date of Patent: May 26, 1992

[54] METHOD FOR DETACKIFYING OVERSPRAYED PAINT

[75] Inventors: Bhupati R. Bhattacharyya, deceased, late of Downers Grove, by Uma Bhattacharyya, executrix; Shu-Jen Huang, Naperville; Chandrashekar S. Shetty, Lisle; Nang T. Bui, Aurora; Yvonne O. Dunn, Naperville, all of Ill.

[73] Assignee: Nalco Chemical Company, Naperville, Ill.

[21] Appl. No.: 681,751

[22] Filed: Apr. 8, 1991

[51] Int. Cl.$^5$ .............................. C02F 1/56
[52] U.S. Cl. ........................ 210/712; 55/85; 134/38; 210/728; 210/734; 210/930; 252/181
[58] Field of Search ............... 210/708, 728, 732, 734, 210/930, 712; 252/181; 55/85; 134/38

[56] References Cited

U.S. PATENT DOCUMENTS

| | | | |
|---|---|---|---|
| 3,990,869 | 11/1976 | Forney | 55/19 |
| 4,055,495 | 10/1977 | Gabel et al. | 210/728 |
| 4,067,806 | 1/1978 | Mauceri | 210/734 |
| 4,564,464 | 1/1986 | Harpel et al. | 251/181 |
| 4,600,513 | 7/1986 | Mizutani et al. | 210/712 |
| 4,637,824 | 1/1987 | Pominville | 55/85 |
| 4,656,059 | 4/1987 | Mizuno et al. | 210/930 |
| 4,686,047 | 8/1987 | Arots | 210/712 |
| 4,753,738 | 6/1988 | Huang | 210/727 |
| 4,759,855 | 7/1988 | Kaiser | 210/712 |
| 4,863,615 | 9/1989 | Stenger et al. | 210/712 |
| 4,948,513 | 8/1990 | Mitchell | 210/705 |

OTHER PUBLICATIONS

"Paint Spray Booth Sludge Handling" Shu-Jen W. Huang, presentation at SME Automation of Paint Lines, Apr. 1987, at Chicago, Ill.
"Troublesome Paint Sludge Becomes Plant Fuel Under New Process", Vince Courtenay, Ward's AutoWorld, 1984.

*Primary Examiner*—Peter Hruskoci
*Attorney, Agent, or Firm*—Joan I. Norek; Robert A. Miller; Joseph B. Barrett

[57] ABSTRACT

Oversprayed paint in a paint spray operation is detackified by dosing the water of the waste water system of such operation with a composition comprising a polymer and aluminum sulfate. The polymer contains at least about 10 mole percent of cationic mer units of monoethylenically unsaturated monomer.

8 Claims, 1 Drawing Sheet

METHOD FOR DETACKIFYING OVERSPRAYED PAINT

TECHNICAL FIELD OF THE INVENTION

The present invention is in the technical field generally of waste treatment, and more particularly in the technical field of detackification of waste paint, particularly detackification of oversprayed paint in

BACKGROUND OF THE INVENTION

In many painting systems for automobiles, various household electrical applicances, and the like, the products are coated or painted in enclosed areas referred to generally as paint spray booths. Generally a significant portion of the paint is oversprayed, that is, not transferred to the object being coated. Such waste paint is generally referred to as oversprayed paint.

The term "paint" as used herein includes paint in its ordinary sense, that is, a mixture of pigment and a suitable liquid vehicle that is reasonably fluid and provides a thin and adherent coating when spread on an appropriate surface. The term "paint" as used herein also includes other paint-like fluid coating materials. Hence the term "paint" as used herein refers to paints, lacquers, varnishes, base coats, clear coats and the like.

Paint spray booths are generally comprised of a chamber, a duct system for passing an air stream down through the chamber, and a sump or recirculating water system, the bulk of which is located at the bottom of the chamber. The air stream is a type of wash stream that generally captures oversprayed paint and carries it towards the sump. The water within the sump is generally treated so that the oversprayed paint, when it is carried to such water, is formed into a paint sludge. Such paint sludge typically floats at or near the surface of such water, and can be removed by skimming or similar means.

The tendency of such paint sludge to float also permits reasonably efficient water recycling, because reasonably sludge-free water can be drawn from or near the bottom of the sump. In some installations, water at least partially withdrawn from the sump is pumped upward to a point where it cascades down the sides of the chamber, forming a vertical curtain of water that protects the chamber walls.

It is extremely important to the efficient operation of such paint spray booths, and to the efficient waste treatment of such oversprayed paint wastes, that the oversprayed paint be detackified when it contacts the water system, or waste water.. system. Such contact may be made with the water present in the booth or with the water recirculated to the water curtain that protects the chamber walls. By detackification is meant herein that the adhesive properties (tackiness) of the paint overspray are minimized or eliminated. It is severely undesirable to have such overspray adhere to the walls of the paint spray booth chamber or the walls of the sump. It is severely undesirable to have such paint overspray adhere to any surface that may be encountered in the spray booth, or during its removal from the spray booth and subsequent disposal.

It is also advantageous if a paint detackifying agent promotes the formation of paint sludge that can be efficiently removed and dewatered. Removal and dewatering of paint sludge is affected by a plurality of sludge characteristics, including besides detackification, cohesiveness to promote easy sludge removal, low water content for total volume reduction, low or no solvent encapsulation to reduce the hazardous properties of the sludge and the like. High solids and minimum solvent are requirements under most sludge landfill disposal regulations. An initial dewatering of the sludge occurs during sludge removal, and the sludge collected may be further dewatered using such devices as a plate and frame filter, a vacuum filter, a centrifuge, a twin belt press or the like. For effective dewatering during the sludge removal and when the collected sludge is further dewatered using a dewatering device, the sludge paint must be well detackified.

It is also desirable that a paint detackifying agent have a high loading capability in the system in which it is used. A detackifying agent of high loading capability is one that can withstand a high volume of oversprayed paint before exhaustion, that is, the point at which detackification performance falls to an unacceptable level. In a process where the paint detackifying agent is fed to the water system continuously, for instance on a constant feed mode, the loading capacity of the detackifier will determine the maintenance feed rate. A detackifier with a high loading capacity will require a lower maintenance feed rate. If a system is not continuous and is instead run to, or close to, the point of exhaustion of the detackifier present, a detackifier of high loading capability would permit the water system to handle a higher volume of oversprayed paint before shutdown. A paint detackifying agent of high loading capability (amount of oversprayed paint detackified per unit additive) is cost efficient, and in a continuous operation the loading capability of of the paint detackification agent is seen from the lower maintenance levels required.

It is also highly desirable that the detackifying agent be dispersible in the waste water system with reasonable efficiency. An additive that requires auxiliary equipment for mixing and dispersing would increase the operation costs and serving time required. Hence it is desirable that the detackifying agent can be provided in suitable form for charging directly to the waste water system, and be dispersed homogeneously therein rapidly, at normal operating temperatures and without agitation other than that provided by the normal operation pumping action and the like.

As noted above, the paint sludge that is formed generally floats on or near the top of the water present in the sump. Generating such floating sludge, and reducing the amount of sinking sludge, is desirable and extends the time between pit cleanings. Generation of floating sludge in some systems is assisted by air flotation means. The removal of the sludge on or near the top of the water may be accomplished using one or more of a variety of systems, including without limititation by skimming, by screening or straining, by dispersing the sludge in the water of the sytem and then discharging a portion of such water, and the like. Sinking sludge is generally removed at given periods. In some operations the sludge removal is continuous and such continuous sludge removal systems frequently use a pedal wheel, skimmer, or a side-stream sludge removal when an air assisted floating unit is used to separate the sludge from the water. As noted above, efficient sludge removal is dependent in part on sludge characteristics. The paint should be well detackified and the sludge preferably should be cohesive.

DISCLOSURE OF THE INVENTION

Figure 1:
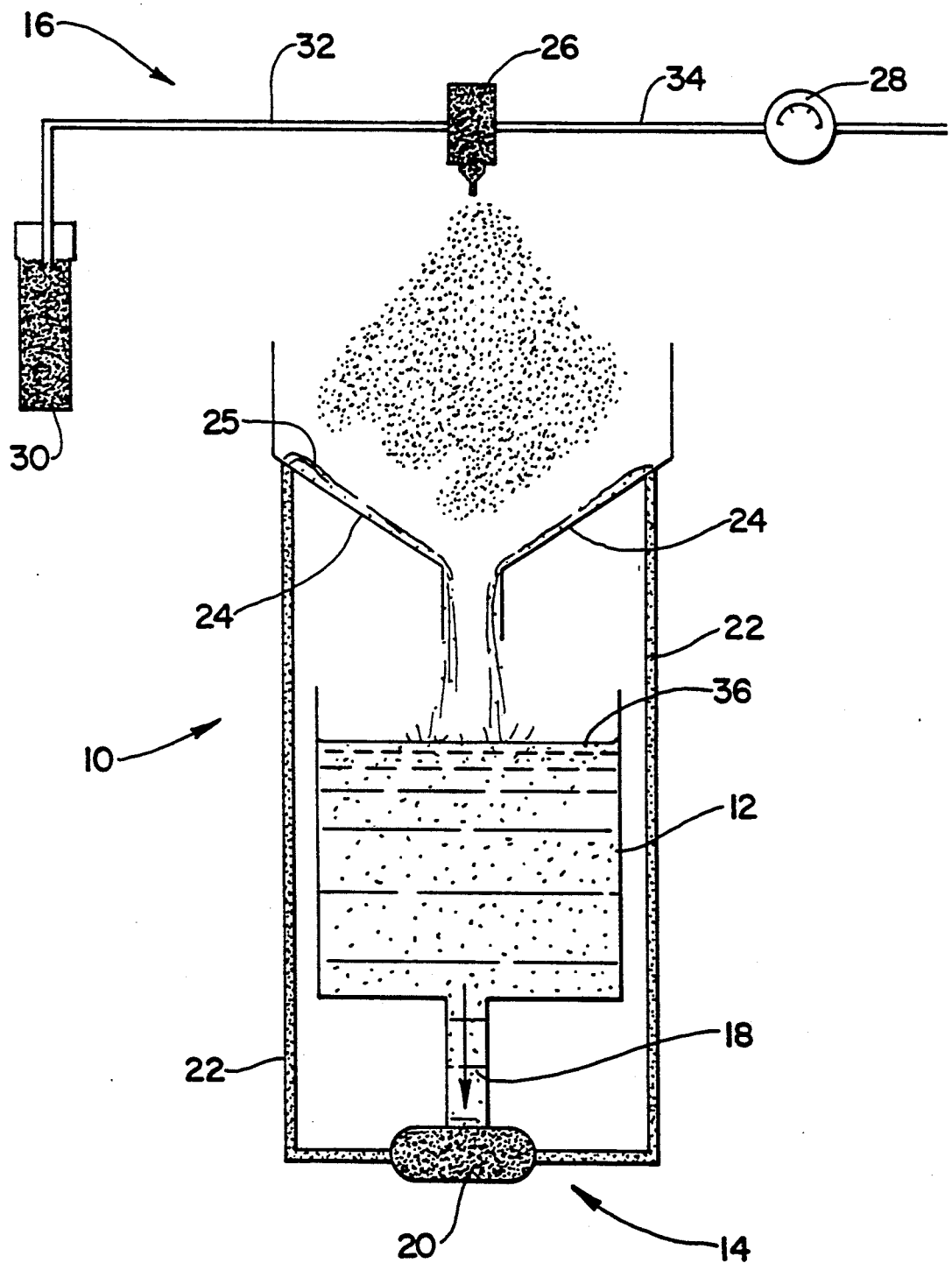
FIG. 1 is a side view of a recirculating test unit used in a Recirculator Test described hereinafter to demonstrate the detackification performance of the present invention on a laboratory scale that simulates commercial paint spray booth operations. The drawing of FIG. 1 is a schematic drawing.

The present invention provides a process or method for the detackfication of oversprayed paint in a paint spray operation wherein the oversprayed paint comes into contact with the water of a waste water system. The present invention also provides a method for the treatment of water in a paint spray operation waste water system wherein the oversprayed paint comes into contact with such water. In the present process a composition comprising a polymer and aluminum sulfate is added to such water. The polymer is characterized in being comprised of at least about 10 mole percent of cationic mer units of monoethylenically unsaturated monomer. A mer unit, as this term is used herein, refers to a segment of such polymer that contains two adjacent backbone carbons, and is generally, but not necessarily, derived from the characterizing monomer. Defining a mer unit in terms of a monoethylenically unsaturated characterizing monomer, although such unsaturation is lost during polymer formation, is well understood in the art. A cationic mer unit, as such term is used herein, includes mer units that do not retain their cationic nature at all pH's.

In preferred embodiment, the polymer is one that is also comprised of (meth)acrylamide mer units, as described in more detail below together with the descriptions of other preferred embodiments.

PREFERRED EMBODIMENTS OF THE INVENTION

As indicated above, in preferred embodiment the polymer of the polymer/aluminum sulfate composition preferably but not necessarily is comprised of both the cationic mer units of monoethylenically unsaturated monomer and (meth)acrylamide mer units. In a more preferred embodiment, such polymer is comprised of from about 10 to about 50 mole percent of such cationic mer units, and from about 50 to about 90 mole percent of such (meth)acrylamide units. Again, although such more preferred embodiment includes polymers having a higher mole percent of (meth)acrylamide mer units than such cationic mer units, polymers containing up to 100 percent of such cationic mer units are not by implication being excluded. Such homopolymers of cationic mer units of monoethylenically unsaturated monomer include embodiments of the present invention demonstrating high activity in the process of the present invention.

In more detail, the cationic mer units of ethylenically unsaturated monomer include quaternary ammonium salt mer units and sulfuric acid salt mer units, such as the cationic mer units of the polymers employed in various of the Examples below, which mer units, and the abbreviations for such mer units used at times herein, are set forth below in Table 1. It is noted here that a mer unit such as dimethylaminoethylmethacrylate sulfuric acid salt is cationic in nature at pH's of below about 6, and as noted above such a mer unit is clearly not excluded from the category of cationic mer units regardless of the pH of the environment employed in the present process.

TABLE 1

| Abbreviation | Cationic Mer Units |
|---|---|
| DMAEM.H$_2$SO$_4$ | Dimethylaminoethylmethacrylate sulfuric acid salt |
| DMAEM.MCQ | Dimethylaminoethylmethacrylate methyl chloride quaternary ammonium salt |
| DMAEM.MSQ | Dimethylaminoethylmethacrylate methyl sulfate quaternary ammonium salt |
| DMAEA.MCQ | Dimethylaminoethylacrylate methyl chloride quaternary ammonium salt |
| APTAC | Acrylamidopropyltrimethyl ammonium chloride |

As mentioned above, in certain preferred embodiments the polymer of the polymer/aluminum sulfate composition contains from about 50 to about 90 mole percent of (meth)acrylamide mer units, and from about 10 to about 50 mole percent of cationic mer units of monoethylenically unsaturated monomer. In certain more preferred embodiments, such polymer is comprised of from about 65 to about 85 mole percent (meth)acrylamide units and from about 15 to about 35 mole percent of such cationic mer units. In certain more preferred embodiments, such polymer is comprised of from about 70 to about 80 mole percent of (meth)acrylamide units and from about 20 to about 30 mole percent of such cationic mer units.

In other preferred embodiments, the cationic mer units of monoethylenically unsaturated monomer of the polymer of the composition is substantially the DMAEM·H$_2$SO$_4$ mer unit, and employment of a homopolymer of such mer unit in the polymer/aluminum sulfate composition has provided significant detackification activity in the present process. In more preferred embodiment, the polymer of the polymer/aluminum sulfate composition used in the present process is substantially a copolymer of DMAEM·H$_2$SO$_4$ and acrylamide ("AcAm") having from about 15 to about 50 mole percent of DMAEM·H$_2$SO$_4$ and from about 50 to 85 mole percent of AcAm. In even more preferred embodiment, the polymer of such polymer/aluminum sulfate composition is comprised of from about 20 to about 30 mole percent of DMAEM·H$_2$SO$_4$ and from about 70 to about 80 mole percent of AcAm.

It is possible to incorporate into the polymer of the polymer/aluminum sulfate composition mer units other than such cationic mer units of monoethylenically unsaturated monomer and (meth)acrylamide mer units, provided that such other mer units do not have any serious deleterious effect on the activity of the composition in the process of the present invention. In such preferred embodiments that are characterized at least in part by the mole percentages of such cationic mer units and (meth)acrylamide mer units, the cationic mer units and (meth)acrylamide mer units would of course remain within their respective mole percentage ranges despite the presence of other mer units in the polymer.

In preferred embodiment, the polymer of the polymer/aluminum sulfate composition has an intrinsic viscosity ("IV") of from about 0.4, or 0.5, to about 4.0. In more preferred embodiment, such polymer has an IV of from about 1.0, or 1.2, to about 3.8.

Aluminum sulfate is generally available as the aluminum sulfate octadecahydrate, which has the chemical formula of Al$_2$(SO$_4$)$_3$·18H$_2$O, and while the octadecahydrate form is often referred to itself as "alum", the term "alum hydrate" is used herein at times for the octadecahydrate form of aluminum sulfate. Since alum hydrate is about 50 weight percent aluminum sulfate (51.3 wt. percent if the alum hydrate contains the total theoretical water), parameters set forth herein that are based on the weight of alum hydrate are easily convertible to parameters based on weight of $Al_2(SO_4)_3$.

In preferred embodiment, the polymer/aluminum sulfate composition contains from about 0.2 to about 8.0, or 10.0, parts by weight of alum hydrate (aluminum sulfate as the octadecahydrate) for each part by weight of the polymer. In more preferred embodiment, the polymer/aluminum sulfate composition is comprised of from about 0.5 to about 5.0 parts by weight of alum hydrate per each part by weight of the polymer. In terms of aluminum sulfate, as $Al_2(SO_4)_3$, in preferred embodiment the polymer/aluminum sulfate composition contains from about 0.1 to about 4.0, or 5.0, parts by weight of aluminum sulfate per each part by weight of polymer, and in more preferred embodiment, from about 0.25 to about 2.5 parts by weight of aluminum sulfate for each part by weight of the polymer.

In more specific embodiments, the preferred polymers of $DMAEM \cdot H_2SO_4$ and AcAm have an intrinsic viscosity of from about 0.4, or 0.5, to about 4.0, and more preferably from about 1.0, or 1.2, to about 3.8. In further more specific embodiments, the preferred polymers of $DMAEM \cdot H_2SO_4$ are within compositions having from about 0.25 to about 2.5 parts by weight of aluminum sulfate for each part by weight of such polymer.

The $DMAEM \cdot H_2SO_4$ monomer may be formed by premixing DMAEM and $H_2SO_4$ in aqueous solution, prior to charging such components to the polymerization vessel. Alternatively, the DMAEM, AcAm and some water of dilution may be charged to the polymerization vessel, and then the $H_2SO_4$ required to form the $DMAEM \cdot H_2SO_4$ may be added, slowly so as not to raise the temperature of the admixture, prior to the initiation of the polymerization.

Preferably the polymer/aluminum sulfate composition is formed as an aqueous solution of the polymer and aluminum sulfate, and is introduced into the waste water system as such an aqueous solution so as to be dispersible in such system with reasonable efficiency and without the use of any auxilliary equipment. Aqueous solutions of such composition having Brookfield viscosities up to about 2000 cps are readily dispersible in such waste water systems at ambient room temperature, requiring no more agitation for complete dispersion other than the normal agitation provided by virtue of the recycling of the water in the system. Moreover, aqueous solutions of such compositions having Brookfield viscosities up to even 3000 cps have no significant practical disadvantages as to introduction into the water system. It is an advantage of the present invention that the polymer/ aluminum sulfate composition can be charged to the water of a waste water system in a paint spray operation as an aqueous solution.

The process of the present invention is particularly useful for paint spray operations employing solvent based paints such as clear coats and enamels, and waterborne (water continuous) paints.

In preferred embodiments, the polymer/aluminum sulfate (as the octadecahydrate) is added to the waste water system of a paint spray operation (described in detail above) in sufficient amount to provide a concentration thereof in such water of from about 1 to about 1,000 ppm, and more preferably from about 5 to about 250 ppm. In preferred embodiments, the capacity of the polymer/aluminum sulfate (as the octadecahydrate) composition is from about 100 ml. of oversprayed paint for each 0.01 to 10.0 grams of such composition, and more preferably about 100 ml. of oversprayed paint for each 0.05 to 5.0 grams of such composition, based on actives thereof.

Recirculator Test

In Examples 1 through 46 the paint detackification performance of the process of the present invention was determined using a Recirculator Test, as follows. Referring to FIG. 1, there is shown a recirculator testing unit, designated generally by the reference numeral 10. The recirculator testing unit 10 is comprised of a recirculator vessel 12, a means for recirculating fluid 14, and a paint spray assembly 16. The recirculator vessel 12 is open at its top and bottom to the recirculating means 14. The recirculating means 14 is comprised of a vessel duct 18, a recirculator pump 20, an encircling water-way 22, and a funnel 24. The vessel duct 18 interconnects the vessel 12 with the recirculator pump 20, which pump 20 is disposed below the vessel 12. The encircling water-way 22 encircles the vessel 12 about the vessel's entire side-circumference. The water-way 22 is interconnected to the pump 20, and provides a channel for the fluids passing through the duct 18 and pump 20, upward to the funnel 24, where the fluid falls back into the vessel 12, forming a water curtain 25 along the upper surface of the funnel 24. The paint spray assembly 16 is comprised of a spray gun 26, disposed above the funnel 24, a pressure regulator 28, means for providing pressure (compressed air, not shown), a paint supply 30, and a first and second line 32, 34 interconnecting respectively the spray gun 26 to the paint supply 30 and pressure regulator 28. The Recirculator Test is conducted with the recirculator testing unit 10 as follows. 19,000 ml. of tap water is charged to the recirculator vessel 12 and then the pump 20 is started. The pump 20 draws the fluid (water, and later water and additive) through the duct 18 and pumps it upward through the encircling water-way 22, where the fluid flows down the funnel 24, back into the vessel 12. An initial charge of detackifying agent is then added, while such pumping is continued for the duration of the test. After the first five minutes of pumping the water and detackifying agent from the vessel up to the water-way 22, sodium hydroxide is added as needed to adjust the pH of the vessel contents to about 8.6, or at least to within the range of from a pH of 8 to a pH of 9. When a stable pH reading at the desired pH is obtained (measured with a standard meter) the paint spray is commenced. The gun 26 is an air atomized spray gun that is directed downward into the funnel 24. The paint spray assembly 16 is preadjusted so as to spray paint into the funnel 24 at a rate of from about 1.5 to about 2.0 ml. of paint per minute, using an air pressure of from about 20 to about 30 psi. The spray gun 26 is disposed about 12 inches above the top rim of the funnel 24. The expected result of such paint spraying and fluid recirculating is the formation of a paint sludge 36 which floats on the top of the vessel fluid 38. Such paint sludge 36 is checked at intervals by the tester, using a water-wetted hand to squeeze a sample of the paint sludge between her or his fingers. Such paint sample is thereby evaluated for tackiness and assigned a numerical rating of from 10 to 0, described in more detail below. At the time of the first sampling and testing, the paint sludge must have a rating of at least 6. The paint spraying and sampling continues until the sludge rating falls to 5, at which initial end point the paint spray is interrupted, the floating paint sludge is removed, a maintenance dose of additive is added to the vessel 12, the pH is measured and readjusted if necessary, and then the paint spraying is recommenced until the rating of 5 end point is reached with such maintenance dosage. Such maintenance dosage runs are repeated at least three times. The test results are expressed as a paint/chemical ratio which is the total amount of paint sprayed (in ml.) during a maintenance dosage run (until the end point of a rating of 5 is reached), divided by the maintance dosage of the additive used (in ml. of aqueous solution of additive, discussed below). Generally when a series of additives were tested by this Recirculator Test, a commercial detackification product was also tested as a "standard", and the test results thus can also be expressed as a "Product Replacement Ratio", which is the paint/chemical ratio of the standard divided by the paint/chemical ratio of the additive being compared. A standard paint is sprayed for the Recirculator Test. This standard paint is a clearcoat paint commercially available under the tradename of DCT-3000 from PPG Industries, Inc.

As indicated from the above description of the Recirculator Test, the activity of a maintenance dosage of the detackification agent is being determined, and such activity is being reported numerically in terms of the detackification capacity (volume of paint) per unit additive dosage, and at times also as the relative activity in comparison to the commercial product. The higher the paint/chemical ratio of an additive, the higher is its detackification performance. The lower the Product Replacement Ratio, the higher is its detackification performance.

In addition, the sludge formation is being observed during the test as to whether the type of sludge being formed is desirable for dewatering properties. The overall best performance may at times be deemed an additive that does not have the highest paint/chemical ratio.

the numerical ratings for the paint sludge samples that are used in the Recirculator Test are set forth below in Table 2.

TABLE 2

| Numerical Rating | Summary Description | Paint Sludge Sample Description |
|---|---|---|
| 10 | Perfect | Complete detackification; sludge is soupy. |
| 9 | Excellent | Sludge is non-tacky and non-gritty |
| 8 | Very Good | Sludge is not tacky or gritty, but slightly plastic and may roll. |
| 7 | Good | Sludge is not tacky, but of plastic consistency, rolls and can easily reroll. |
| 6 | Okay | Sludge is very slightly tacky, rolls with water and rerolls, and can wash off with rubbing. |
| 5 | Borderline | Sludge may stick slightly to hand but falls off with rubbing. |
| 4 | Unacceptable | Sludge has a slight tack, sticks to hand with pressure, does not rub off, and may roll. |
| 3 | Moderate failure | Sludge does not roll, sticks to hand and smears |
| 2 | Severe Failure | Sludge is tacky and smears |
| 1 | Sticky | Smears |
| 0 | Raw Paint | Not sludge but more like raw paint. |

The initial charge of a detackifier in the Recirculator Test must in all instances provide initially a rating of 6, and if such rating is not provided by the first dosage of additive, the dosage is increased. When the commercial product is tested, as a standard, the initial charge is always 9.5 ml. of the product (active agents and water), and the maintenance charges are always 1.0 ml., same basis.

In a number of the following Examples, the polymer identification information includes Reduced Specific Viscosity ("RSV"), and in such instances the polymer concentration employed for the RSV that is given is generally set forth in parenthesis following the RSV. The solvent employed for these RSV data was 1 molar aqueous sodium nitrate solution.

EXAMPLES 1 TO 3

Polymers comprised of AcAm and DMAEM·$H_2SO_4$, at varying mole rations, and admixed with aluminum sulfate octadecahydrate at a weight ratio of polymer to the aluminum sulfate octadecahydrate of about 1:1.1, were tested by the Recirculator Test, and the results thereof, together with further polymer identifications, are set forth below in Table 3.

TABLE 3

| Example No. | Mole Percent Mer Units (%) | | Paint Chemical Ratio | Sludge Formation Comments |
|---|---|---|---|---|
| | AcAm | DMAEM. $H_2SO_4$ | | |
| 1 | 89.3 | 10.7 | 16/1 | |
| 2 | 78.2 | 21.8 | 113/1 | adhered to wall |
| 3 | 60.5 | 39.5 | 47/1 | |

EXAMPLES 4 TO 6

The composition used in Example 2 above, that is a 78.2/21.8 mole ratio AcAm/DMAEM·$H_2SO_4$ copolymer, admixed with aluminum sulfate octadecahydrate at a weight ratio of polymer to alum hydrate of 1:1.1, was tested by the Recirculator Test for its paint detackification performance in comparison to compositions having the same copolymer, but admixed with higher and lower amounts of the alum hydrate. The results thereof, and further composition identifications, are set forth below in Table 4.

TABLE 4

| Example No. | Polymer to Aluminum Sulfate Octadecahydrate Weight Ratio | Paint/Chemical Ratio |
|---|---|---|
| 4 | 1/0.5 | 44/1 |
| 5 | 1/1.1 | 113/1 |
| 6 | 1/2.0 | 65/1 |

When sludge formation was considered, the composition of Example 6 was deemed the composition having overall performance qualities of Examples 4 to 6.

EXAMPLES 7 TO 10

Compositions varying in polymer to aluminum sulfate octadecahydrate weight ratio from 1:2 to 1:5 were tested to determine their paint detackification performance using the Recirculator Test. In each of these Examples 7 to 10, the polymer was an AcAm/DMAEM·$H_2SO_4$ copolymer of 78.2/21.8 mole ratio, with a Reduced Specific Viscosity ("RSV"), measured at 0.5% polymer concentration, of 2.79 and an Intrinsic Viscosity ("IV") of 2.07. The polymer's Huggins Constant was 0.34. The results of these tests and the composition identifications are set forth below in Table 6.

TABLE 6

| Example No. | Polymer to Aluminum Sulfate Octadecahydrate Weight Ratio | Paint/Chemical Ratio |
|---|---|---|
| 7 | 1/2 | 58/1 |
| 8 | 1/3 | 38/1 |
| 9 | 1/4 | 24/1 |
| 10 | 1/5 | 21/1 |

Example 7's sludge showed a slight adhesion to the wall of the recirculator. Examples 8 to 10 formed sludges that were rated acceptable to very good. The sludge formation generally increased in rating with the increase in alum hydrate.

EXAMPLES 11 TO 13

The paint detackification performances of several compositions containing a 50/50 weight ratio copolymer of AcAm with varying cationic mer units were determined using the Recirculator Test. Each of the compositions tested was a ⅓ weight ratio composition of polymer to aluminum sulfate octadecahydrate. The test results, the identities of the cationic mer units, and the mole ratios of AcAm/cationic mer units of the polymers are set forth below in Table 7.

TABLE 7

| Example No. | Cationic Mer Unit | Mole % Mer Units AcAm/Cationic | Paint/Chemical Ratio |
|---|---|---|---|
| 11 | DMAEM.H$_2$SO$_4$ | 78.1/21.8 | 29/1 |
| 12 | DMAEM.MSQ | 79.9/20.1 | 43/1 |
| 13 | DMAEM.MCQ | 74.5/25.5 | 14/1 |

EXAMPLES 14 TO 19

The paint detackification and sludge formation performances of a number of compositions were determined using the Recirculator Test. All of the compositions were 1:3 weight ratio compositions of polymer to aluminum sulfate octadecahydrate. The polymers of these compositions were AcAm/DMAEM·H$_2$SO$_4$ copolymers of varying mole ratios. The polymers of Examples 17 to 19 were prepared using a DMAEM monomer which was converted to the H$_2$SO$_4$ salt by the addition of sulfuric acid to the reaction vessel prior to initiation of the polymerization. All polymer/aluminum sulfate octadecahydrate compositions were employed in these tests as aqueous solutions having actives contents of 15.0 theoretical weight percent. The test results, and mer unit mole ratios of the polymers, are set forth below in Table 8. In addition, it was noted that the sludge formation seen in Example 16 was not as desirable as in the other of these Examples.

TABLE 8

| Example No. | Polymer Mer Unit Mole Percent | | Paint/Chemical Ratio |
|---|---|---|---|
| | AcAm | DMAEM.H$_2$SO$_4$ | |
| 14 | 90 | 10 | 13/1 |
| 15 | 78 | 22 | 25/1 |
| 16 | 65 | 35 | 27/1 |
| 17 | 80 | 20 | 34/1 |
| 18 | 70 | 30 | 54/1 |
| 19 | 50 | 50 | 94/1 |

EXAMPLES 20 TO 22

Three 78.2/21.8 mole percent AcAm/DMAEM·H$_2$SO$_4$ copolymers, admixed at a 1:3 polymer/alum hydrate weight ratio, were tested for paint detackification performance using the Recirculator Test. The polymers were synthesized using varying amounts of initiator to provide polymers of varying molecular weights. The test results and further polymer identifications are set forth below in Table 9.

TABLE 9

| Example No. | RSV (0.5% polymer) | IV | Huggins Constant | Paint/Chemical Ratio |
|---|---|---|---|---|
| 20 | 2.79 | 2.07 | 0.34 | 38/1 |
| 21 | 1.14 | 1.02 | 0.24 | 12/1 |
| 22 | 0.63 | 0.56 | 0.42 | 6.5/1 |

EXAMPLES 23 TO 28

Six 78.2/21.8 mole AcAm/DMAEM·H$_2$SO$_4$ copolymers, admixed at a 1:3 polymer/alum hydrate weight ratio, were tested for paint detackification performance using the Recirculator Test. These polymers varied in IV values from 1.70 to 3.59. The test results and further polymer identifications are set forth below in Table 10.

TABLE 10

| Example No. | RSV (0.25% polymer) | IV | Huggins Constant | Paint/Chemical Ratio |
|---|---|---|---|---|
| 23 | 2.03 | 1.70 | 0.44 | 54/1 |
| 24 | 2.35 | 1.97 | 0.44 | 75/1 |
| 25 | 3.05 | 2.49 | 0.32 | 52/1 |
| 26 | 3.26 | 2.69 | 0.29 | 68/1 |
| 27 | 3.73 | 2.94 | 0.34 | 17/1 |
| 28 | 4.96 | 3.59 | 0.42 | 12/1 |

Of the admixtures of Examples 23 to 28, that of Example 24 was deemed to have the best overall performance both as to paint/chemical ratio and sludge performance.

EXAMPLES 29 TO 34

Six 78.2/21.8 mole percent AcAm/DMAEM·MCQ copolymers, admixed at a 1:3 polymer/alum hydrate weight ratio, were tested for paint detackification performance using the Recirculator Test. These polymers varied in IV values from 0.9 to 3.78. The test results and further polymer identifications are set forth below in Table 11.

TABLE 11

| Example No. | RSV (% polymer) | IV | Huggins Constant | Paint/Chemical Ratio |
|---|---|---|---|---|
| 29 | 0.96(.33) | 0.91 | 0.20 | 7.5/1 |
| 30 | 1.60(.33) | 1.45 | 0.29 | 10/1 |
| 31 | 2.31(.33) | 1.96 | 0.56 | 7.5/1 |
| 32 | 2.72(.25) | 2.34 | 0.31 | 24.5/1 |
| 33 | 4.21(.25) | 3.26 | 0.34 | 62/1 |
| 34 | 5.19(.25) | 3.78 | 0.37 | 34/1 |

EXAMPLES 35 AND 36

Two 78.2/21.8 mole percent AcAm/quaternary ammonium salt copolymers, admixed at a 1:3 polymer/alum hydrate weight ratio, were tested for paint detackification performance using the Recirculator Test.

The test results and further polymer identifications are set forth below in Table 12.

TABLE 12

| Example No. | Quaternary Mer Unit | RSV (.33% polymer) | IV | Huggins Constant | Paint/ Chemical Ratio |
|---|---|---|---|---|---|
| 35 | DMAEA.MCQ | 2.15 | 1.66 | 0.98 | 19/1 |
| 36 | APTAC | 2.84 | 2.61 | 0.34 | 39/1 |

EXAMPLE 37

A series of eight 78/22 mole percent AcAm/DMAEM·$H_2SO_4$ copolymers, each admixed with aluminum sulfate octadecahydrate at a weight ratio of 1:3 polymer to alum hydrate, were prepared and tested by the Recirculator Test to determine paint detackification performance. These eight polymers varied in IV values from 1.62 to 2.20, and the admixtures with alum hydrate varied in Brookfield Viscosity from 1260 cps (IV value 1.70 polymer) to 3625 cps (IV value 2.20 polymer). Generally the Brookfield Viscosity increased with increasing IV value. The Paint/Chemical Ratios determined varied from 34/1 to 82/1, indicating that all of these admixtures were of exceptional performance.

EXAMPLES 38 TO 43

In many instances in the conducting of the Recirculator Tests described in Examples 1 through 43 above, a Recirculator Test was also conducted on a certain commercial paint detackification product, for comparison. The numerical comparison determination was expressed as the Product Replacement Ratio, which is discussed in more detail above in the description of the Recirculator Test. In these Examples 38 to 43, the test results for a variety of the polymer/alum hydrate admixtures used in the prior Examples are determined in terms of such Product Replacement Ratio. Such results, the identities of the polymers, the weight ratio of polymer/alum hydrate in the admixture, and a reference to the prior Example Nos. are set forth below in Table 13. The lower the Product Replacement Ratio is, the better the performance of the admixture of the present invention in comparison to this commercial paint detackification product.

recirculator was somewhat physically changed by a part replacement, and the retesting after storage in both instances indicated a decrease in the Paint/Chemical Ratios determined of from about 17 to about 20 percent. The comparisons of Product Replacement Ratios determined before and after storage for both admixtures were, within experimental error, the same, indicating there was no decrease in activities upon storage. These results and further polymer identifications are set forth below in Table 14.

TABLE 14

| | Example No. | |
|---|---|---|
| | 44 | 45 |
| Polymer RSV (0.5% polymer) | 2.03 | 3.26 |
| Polymer IV value | 1.70 | 2.69 |
| Polymer Huggins Constant | 0.44 | 0.29 |
| Initial Paint/ Chemical Ratio | 54/1 | 68/1 |
| Final Paint/ Chemical Ratio | 45/1 | 56/1 |
| Initial Product Replacement Ratio | 0.33 | 0.26 |
| Final Product Replacement Ratio | 0.34 | 0.28 |

EXAMPLE 46

A composition comprised of a homopolymer of DMAEM·$H_2SO_4$ and alum hydrate was tested in the Recirculator Test and determined to have greater detackification activity than the commercial product used as a standard in some of the foregoing Examples.

The polymers used in the present invention may be prepared on a laboratory scale generally as follows. An appropriate polymerization vessel, such as a 2-liter resin flask equipped with stirring and temperature control means, is purged with nitrogen to exclude oxygen therefrom. The desired monomers plus deionized water ("DI water") are admixed in the vessel, generally slowly with the application of cooling means, such as an external ice bath, to minimize any temperature rise above room temperature. A sequestrant, such as ethylenediaminetetraacetic acid tetrasodium salt ("EDTA", available com-

TABLE 13

| Example No. | Prior Example No. | Polymer Mer Units | Mer Units Mole Percents | Polymer/Alum Hydrate Wt. Ratio | Product Replacement Ratio |
|---|---|---|---|---|---|
| 38 | 3 | AcAm/DMAEM.$H_2SO_4$ | 60.6/39.5 | 1:1.1 | 0.47 |
| 39 | 4 | AcAm/DMAEM.$H_2SO_4$ | 78.2/21.8 | 1:0.5 | 0.50 |
| 40 | 20 | AcAm/DMAEM.$H_2SO_4$ | 70/30 | 1:3 | 0.33 |
| 41 | 26 | AcAm/DMAEM.$H_2SO_4$ | 78.2/21.8 | 1:3 | 0.26 |
| 42 | 35 | AcAm/DMAEA.MCQ | 78.2/21.8 | 1:3 | 1.06 |
| 43 | 36 | AcAm/APTAC | 78.2/21.8 | 1:3 | 0.45 |

EXAMPLES 44 and 45

Two admixtures of a 78.2/21.8 mole percent AcAm/DMAEM·$H_2SO_4$ copolymer and aluminum sulfate octadecahydrate, at a weight ratio of polymer to alum hydrate of 1:3 were initially tested and then retested after a storage period of four months, using the Recirculator Test, to determine the stability of the admixture upon storage, at ambient room temperature. In each instance the admixtures were tested in comparison to the commercial product described in Examples 38 to 43 above, and the Product Replacement Ratios were determined. During the four month storage period, the mercially under the tradename of VERSENE from the Dow Chemical Co., of Midland, Mich.) is then usually added, as an aqueous solution in additional DI water. The vessel contents are then heated to about 65° C., at which temperature the initiator is added. The initiator may be ammonium persulfate ("APS") and is generally also added as an aqueous solution in additional DI water. The temperature of the vessel contents is then maintained at the initiation temperature for a two hour reaction time, after which the contents are subjected to a post-reaction heating period of about one hour's duration at about 70° C. After the post-heating period, the vessel contents are cooled to ambient room temperature. During this entire procedure, the vessel contents are continually stirred and kept under a nitrogen blanket. If it is desired to reduce residual acrylamide content down to an undetectable level, sodium metabisulfite, as an aqueous solution in additional DI water, may be added after the vessel contents are cooled, and preferably the stirring would then be continued for a number of hours after that addition.

In the following Examples 47 to 54 the specific procedures used to prepare various polymers are described as further exemplification of appropriate polymerization methods. Any significant deviations from the above described general polymerization method are expressly noted in the specific Examples.

While oxygen is excluded, as described above, these polymerizations may be carried out in the presence of oxygen.

EXAMPLE 47

To a resin flask was charged: 204.92 grams of an aqueous acrylamide solution (48.8 wt. percent AcAm); 200 grams of an aqueous DMAEM·H$_2$SO$_4$ solution (50 wt. percent DMAEM·H$_2$SO$_4$); 0.1 grams EDTA; and 574.98 grams more DI water. The temperature of the flask contents was then raised to 65–70° C., and an initiator premix of 20 grams of a 10 wt. percent APS aqueous solution was added. The general reaction and post-heat time periods and temperatures, as described above, were employed. The resultant polymer solution was very viscous but still fluid. This polymer was employed for the polymer/alum hydrate admixture used in Example 6 above. Such admixture was formed by admixing 134.24 grams of this polymer solution, 107.39 grams of a 59 wt. percent Al$_2$(SO$_4$)$_3$ aqueous solution and 10 grams of a 50 wt. percent H$_2$SO$_4$ aqueous solution.

EXAMPLE 48

The formulation and procedure of Example 48 was the same as Example 47, except that 0.2 grams of EDTA was used, and the 50 wt. percent DMAEM·H$_2$SO$_4$ solution used was from a different premixed batch. The resultant polymer solution was used to prepare the polymer/alum hydrate admixtures of Examples 7 to 10 above.

EXAMPLE 49

The formulation and procedure of Example 49 was the same as Example 48, except that the DI water charged to the flask before heating was reduced from 574.88 grams to 544.88 grams. The Brookfield Viscosity of the resultant polymer solution was 2,400 cps (using #7 spindle at 100 rpm). This polymer solution was used to prepare the polymer/alum hydrate admixture of Example 21 above.

EXAMPLE 50

To a resin flask was charged: 100 grams of an aqueous DMAEM·H$_2$SO$_4$ solution (50 wt. percent DMAEM·H$_2$SO$_4$); 102.04 grams of an aqueous acrylamide solution (49.0 wt. percent AcAm); 790 grams of DI water; and 0.20 grams of EDTA. After raising the flask contents to 65° C., 7.50 grams of a 5 wt. percent APS aqueous initiator solution was added, and the reaction and post-heat procedure, as described above generally, was followed. The Brookfield Viscosity of the resultant polymer solution was 8,000 cps (using #7 spindle at 100 rpm). This polymer solution was used to prepare the polymer/alum hydrate admixture of Example 27 above.

EXAMPLE 51

To a resin flask was charged: 125 grams of an aqueous DMAEM·MSQ solution (80 wt. percent DMAEM·MSQ); 206.61 grams of an aqueous acrylamide solution (48.4 wt. percent AcAm); 648.19 grams of DI water; and 0.20 grams of EDTA. After raising the flask contents to 65° C., 20 grams of a 10 wt. percent APS aqueous initiator solution was added, and the reaction and post-heat procedure as described generally above was followed. This polymer solution was used to prepare the polymer/alum hydrate composition of Example 12 above.

EXAMPLE 52

The procedure described in Example 51 above was followed except that the charges were as follows: 131.58 grams of an aqueous DMAEM·MCQ solution (76 wt. percent DMAEM·MCQ); 206.61 grams of an aqueous acrylamide solution (48.4 wt. percent AcAm); 0.20 grams Versene; 641.61 grams of DI water; and 10.00 grams of a 10 wt. percent APS initiator solution. This polymer solution was used to prepare the polymer/alum hydrate composition of Example 13 above.

EXAMPLE 53

The procedure described in Example 51 above was followed except that the charges were as follows: 59.85 grams of an aqueous DMAEM·MCQ solution (75 wt. percent DMAEM·MCQ); 122.48 grams of an acrylamide aqueous solution (49.0 wt. percent AcAm); 0.20 grams Versene; 812.47 grams of DI water; and 5.00 grams of a 10 wt. percent APS initiator solution (aqueous). This polymer solution was used to prepare the polymer/alum hydrate composition of Example 33 above.

EXAMPLE 54

The procedure described in Example 51 above was followed except that the charges were as follows: 225.45 grams of an aqueous acrylamide solution (49.0 wt. percent AcAm); 149.22 grams of an aqueous APTAC solution (60 wt. percent APTAC); 0.10 grams Versene; 605.23 grams of DI water; and 20.0 grams of a 10 wt. percent APS aqueous initiator solution. This polymer solution was used to prepare the polymer/alum hydrate composition of Example 36 above.

The Brookfield viscosities of the polymer solutions prepared in Examples 53 and 54 above were respectively 23,360 and 39,800 cps.

Industrial Applicability of the Invention

The present invention is applicable to industries employing paint spray operations, including but not limited to the automotive industry, appliance industries, and the like.

We claim:

1. A method for the detackificaton of oversprayed paint in a paint spray operation wherein said oversprayed paint comes into contact with water of a waste water system, comprising:
    dosing said water of said waste water system with a composition comprising a polymer and aluminum sulfate,
    said polymer consisting essentially from about 10 to about 50 mole percent of cationic mer units of monoethylenically unsaturated monomer, selected from a dimethylaminoethylmethacrylate sulfuric acid salt, and from about 50 to about 90 mole percent of (meth)acrylamide mer units, said polymer having an intrinsic viscosity of from about 1.2 to about 4.0 said composition containing from about 0.2 to about 10.0 parts by weight of aluminum sulfate as the octadecahydrate for each part by weight of said polymer, wherein said composition is present in said water of said waste water system in sufficient amount to detackify oversprayed paint when said oversprayed paint comes into contact with said water.

2. The method of claim 1 wherein said polymer consists essentially of from about 15 to about 35 mole percent of said cationic mer units and from about 65 to about 85 mole percent of (meth)acrylamide mer units.

3. The method of claim 1 wherein said polymer has an intrinsic viscosity of from about 1.2 to about 3.8.

4. The method of claim 1 wherein said composition contains from about 0.5 to about 5.0 parts by weight of aluminum sulfate as the octadecahydrate for each part by weight of said polymer.

5. The method of claim 1 wherein said polymer consists essentially of from about 20 to about 30 mole percent of said cationic mer units and from about 70 to about 80 mole percent of (meth)acrylamide units;

wherein said polymer has an intrinsic viscosity of from about 1.2 to about 3.8; and wherein said composition contains from about 0.5 to about 5.0 parts by weight of aluminum sulfate as the octadecahydrate for each part by weight of said polymer.

6. The method of claim 1 wherein said water is dosed with said composition in sufficient amount to provide a concentration of said polymer and said aluminum sulfate, as the octadecahydrate, in said water of from about 1 to about 1,000 ppm.

7. The method of claim 1 wherein said water is dosed with said composition in sufficient amount to detackify oversprayed paint and provide a cohesive sludge formation.

8. The method of claim 1 wherein said polymer and said aluminum sulfate are in the form of an aqueous solution when said water is dosed therewith.

* * * * *

UNITED STATES PATENT AND TRADEMARK OFFICE
CERTIFICATE OF CORRECTION

PATENT NO. : 5,116,514
DATED : May 26, 1992
INVENTOR(S) : Bhattacharyya, deceased et al.

It is certified that error appears in the above-identified patent and that said Letters Patent is hereby corrected as shown below:

In column 1, line 9, after "paint in" insert -- paint spray booths. --.

In column 5, line 33, delete "$H_2 : SO_4$", and substitute therefor "-- $H_2SO_4$ --.

In column 7, line 43, before "numerical", delete "the", and substitute therefor -- The --.

In column 8, line 19, delete "rations", and substitute therefor -- ratios --.

In column 10, line line 22, after "mole", insert -- percent --.

In column 13, line 34, delete "134 24" and substitute therefor -- 134.24 --.

Signed and Sealed this

Twentieth Day of July, 1993

MICHAEL K. KIRK

*Attesting Officer*     *Acting Commissioner of Patents and Trademarks*